E. ROIRANT.
METHOD OF AND APPARATUS FOR GATHERING GLASS BY SUCTION.
APPLICATION FILED NOV. 14, 1918.

1,311,249. Patented July 29, 1919.

Inventor,
Emile Roirant.
Per. John K. Raworth
Atty

UNITED STATES PATENT OFFICE.

EMILE ROIRANT, OF ST. OUEN, FRANCE, ASSIGNOR TO ARTHUR WILZIN, OF ST. OUEN, FRANCE.

METHOD OF AND APPARATUS FOR GATHERING GLASS BY SUCTION.

1,311,249.　　　　　Specification of Letters Patent.　　Patented July 29, 1919.

Application filed November 14, 1918.　Serial No. 262,591.

*To all whom it may concern:*

Be it known that I, EMILE ROIRANT, a citizen of the Republic of France, and resident of St. Ouen, Seine, France, have invented new and useful Improvements in Methods of and Apparatus for Gathering Glass by Suction, of which the following is a specification.

This invention relates to a method of and apparatus for gathering glass by suction.

In the ordinary methods of gathering glass by suction the introduction of the lower portion of the gathering means or suction mold into the molten glass has the effect (by reason of the metallic contact of the device with the glass) of causing a cooling of the glass, and such an injurious effect that after several successive gathering operations at the same place the glass can no longer be used.

This invention has for object a new method of gathering whereby contact between the gathering means or suction mold and the glass, and consequently the above-mentioned disadvantage, is avoided.

This new method of gathering is characterized by the molten glass passing to the gathering means through an aperture in a block supported with its lower face in the molten glass. The block may comprise a float in the molten glass. This float is preferably constructed and arranged so that when at rest the upper edge of its opening is a little above the surface of the glass and when in operation in conjunction with the gathering means it is immersed in the glass to such an extent that the upper edge of its opening is submerged and the glass enters the lower end of the gathering means thereby making a tight joint between the gathering means and the float.

The accompanying drawing shows, by way of example, one method of carrying out the present invention.

Figure 2:
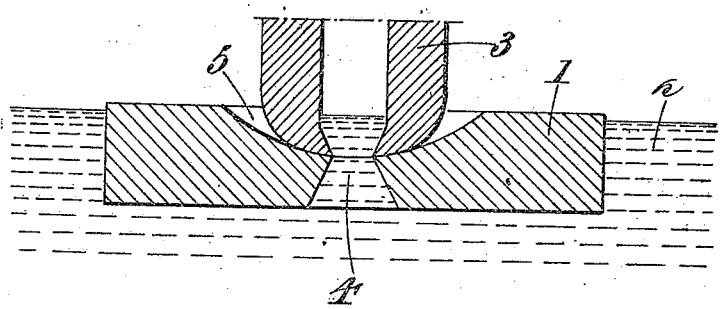
Fig. 2 shows it in operation.

As shown on the drawing, a float 1 of any suitable material, such, for example as silica brick, is disposed in a bath of molten glass 2 under the suction gathering means 3. The float 1 is provided with an aperture 4 which is situated opposite to the orifice in the gathering means 3 and of which the center corresponds approximately with that of the said orifice. Preferably the float 1 is also provided on its upper face with a cavity 5 about the aperture 4 to receive the lower end of the gathering means 3 when the gathering is effected as shown in Fig. 2.

Figure 1:
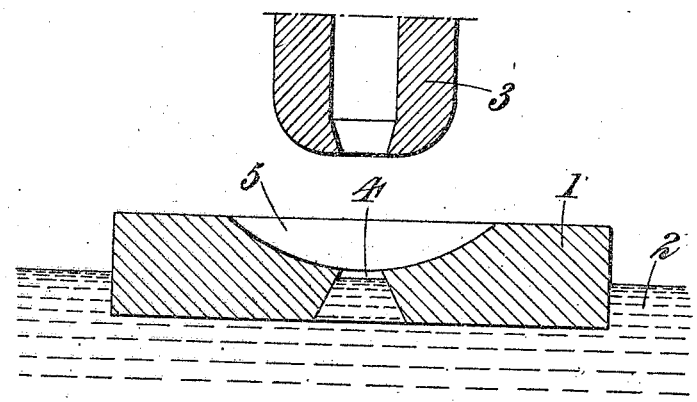
Figure 1 shows in section the gathering means at rest.

In its position of rest (Fig. 1) the float 1 stands above the molten glass so that the upper edge of its aperture 4 is slightly above the surface of the glass.

When the gathering is carried out, the suction gathering means 3 is brought with its lower end into contact with the cavity 5 in the float 1 so that the lower edge of its orifice coincides with the upper edge of the aperture 4 of the float. As the gathering means 3 continues to be pressed against the floating block, it exerts a downward pressure on the float 1 and submerges it in the glass so that the upper edge of the opening 4 is brought below the surface of the glass which enters the lower portion of the gathering means 3 (Fig. 2).

A vacuum is then produced in the interior of the gathering means 3 and the gathering of the glass is effected.

By means of the device described the external surface of the gathering means does not come into contact with the mass of the glass and cannot therefore cause any injurious cooling thereof.

Moreover, even before the gathering of the glass is commenced by the gathering means 3, the tightness of the joint between the said means and the float 1 is insured in a perfect manner by the glass which has entered the lower portion of the gathering means as hereinbefore described.

It is also possible to obtain an external joint of glass between the float 1 and the gathering means 3 by depressing both parts more deeply in the glass so that the float is submerged to such an extent that the molten glass fills the cavity 5.

It is to be understood that the above-described device is given only by way of example and that the form, dimensions and details of construction of the float and of the gathering means may be modified.

What I claim is:—

1. Apparatus for gathering glass by suction comprising, in combination, a molten glass container, an apertured block supported with its lower face in the molten glass the upper face of the block having a cavity communicating with said aperture, gathering means for the glass, and means to place the gathering means into contact with the block over the aperture therein.

2. Apparatus for gathering glass by suction comprising, in combination, a molten glass container, an apertured block supported with its lower face in the molten glass and having a cavity in its upper face about said aperture, gathering means for the glass, and means to place the gathering means into contact with the walls of the cavity in the block and over the aperture therein.

3. Apparatus for gathering glass by suction, comprising, in combination, a molten glass container, an apertured float in the molten glass, gathering means for the glass, and means to place the gathering means into contact with the float over the aperture therein.

4. Apparatus for gathering glass by suction comprising, in combination, a molten glass container, an apertured float in the molten glass having a cavity in its upper face about said aperture, gathering means for the glass and means to place the gathering means into contact with the walls of the cavity in the float and over the aperture therein.

5. A glass gathering apparatus comprising a molten glass container, a float disposed in said container in the molten glass, said float having an aperture substantially filled with the molten glass, and being provided with a cavity in its upper face communicating with said aperture, and a glass gathering means provided with an opening arranged to register with the upper mouth of the aperture, and adapted to be brought into contact with the walls of the cavity.

6. The herein described method of gathering glass from a molten glass container having an apertured float therein, which consists in applying to the aperture of the float a glass-gathering suction device, forcing said float downwardly by means of said suction device, and removing the glass thus forced through the aperture into the suction device by suction.

Dated this 24th day of October 1918.

EMILE ROIRANT.